United States Patent
Yoon et al.

(10) Patent No.: US 7,847,874 B2
(45) Date of Patent: Dec. 7, 2010

(54) DISPLAY PANEL AND METHOD OF MANUFACTURING A DISPLAY SUBSTRATE OF THE DISPLAY PANEL

(75) Inventors: Yeo-Geon Yoon, Seoul (KR);
Sung-Hwan Bae, Chungcheongnam-do (KR); Jae-Ho Lee, Chungcheongnam-do (KR); Seung-Sok Son, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 203 days.

(21) Appl. No.: 12/174,022

(22) Filed: Jul. 16, 2008

(65) Prior Publication Data

US 2009/0122214 A1     May 14, 2009

(30) Foreign Application Priority Data

Nov. 14, 2007 (KR) .................. 10-2007-0115796

(51) Int. Cl.
*G02F 1/136* (2006.01)
(52) U.S. Cl. ........................... 349/48; 349/187
(58) Field of Classification Search ............... 349/48, 349/111, 114, 187
See application file for complete search history.

(56) References Cited

U.S. PATENT DOCUMENTS

| | | | | |
|---|---|---|---|---|
| 6,900,869 B1 * | 5/2005 | Lee et al. | | 349/129 |
| 7,145,619 B2 * | 12/2006 | Sawasaki et al. | | 349/129 |
| 7,298,356 B2 * | 11/2007 | Murade | | 345/92 |
| 2004/0239698 A1 * | 12/2004 | Kamada et al. | | 345/714 |
| 2007/0109469 A1 * | 5/2007 | Jeon et al. | | 349/110 |

FOREIGN PATENT DOCUMENTS

| | | |
|---|---|---|
| KR | 1020010009747 | 2/2001 |
| KR | 1020020092721 | 12/2002 |
| KR | 1020040026039 | 3/2004 |

OTHER PUBLICATIONS

English Language Abstract for KR Publication No. 1020040026039, Mar. 27, 2004, 1 page.
English Language Abstract for KR Publication No. 1020020092721, Dec. 12, 2002, 1 page.
English Language Abstract for KR Publication No. 1020010009747, Feb. 5, 2001, 1 page.

* cited by examiner

*Primary Examiner*—Akm E Ullah
(74) *Attorney, Agent, or Firm*—Innovation Counsel LLP

(57) ABSTRACT

A display panel includes n gate lines, a data line, a first pixel and a second pixel. The gate lines extend in a first direction. The data line extends in a second direction transverse to the first direction. The first pixel includes a first pixel electrode connected to one of the (n−1) gate lines to receive a data voltage through the data line. The second pixel includes a second pixel electrode and a light-blocking pattern. The second pixel electrode is connected to the (n)-th gate line to receive the data voltage through the data line. The first light-blocking pattern overlaps with the second pixel electrode to possibly reduce a luminance difference between the first and second pixels.

20 Claims, 12 Drawing Sheets

DISPLAY PANEL AND METHOD OF MANUFACTURING A DISPLAY SUBSTRATE OF THE DISPLAY PANEL

CROSS-REFERENCE TO RELATED APPLICATIONS

The present application claims priority under 35 U.S.C. §119 to South Korean Patent Application No. 2007-115796, filed on Nov. 14, 2007 in the Korean Intellectual Property Office (KIPO), the contents of which are herein incorporated by reference in their entirety.

BACKGROUND OF THE INVENTION

1. Field of the Invention

The present invention relates to display panels.

2. Description of the Related Art

Generally, a liquid crystal display (LCD) when positioned horizontally with its face up includes a lower substrate, an upper substrate facing the lower substrate, and a liquid crystal layer between the upper and lower substrates. The lower substrate includes gate lines and data lines transverse to the gate lines, and also includes pixel electrodes and thin-film transistors (TFT) connected to the gate lines and the data lines to charge the pixel electrodes. The upper substrate includes color filters coordinated with the pixel electrodes and also includes a common electrode facing the pixel electrodes.

In a normally white mode LCD, a pixel is white at a turn-off voltage and black at a turn-on voltage. The liquid crystal has birefringence at the turn-on voltage. When the liquid crystal molecules are substantially normal to the substrates and the LCD is viewed from a direction normal to the substrates, the LCD displays black. However, when viewed from a slanting direction relative to the substrates, the LCD does not necessarily display perfect black because of the birefringence of the liquid crystal. Thus, the LCD has a limited viewing angle. In order to improve the viewing angle, a patterned vertical alignment (PVA) mode has been developed. In the PVA mode LCD, patterns are formed in the common electrode and the pixel electrodes to define multiple domains to appropriately shape the electric field in the liquid crystal. However, in the PVA mode, the pixels in the last horizontal row (i.e. the bottom row when the LCD is vertical) are brighter than the remaining pixels. The image quality is therefore reduced.

SUMMARY OF THE INVENTION

Some embodiments of the present invention provide a display panel capable of improving the image quality. Some embodiments also provide methods for manufacturing a display substrate for such a display panel.

In an aspect of the present invention, a liquid crystal display (LCD) panel includes n (n being a natural number) gate lines, a data line, a first pixel and a second pixel. The n gate lines are extended in a first direction. The data line is extended in a second direction transverse to the first direction. The first pixel includes a first pixel electrode that is electrically connected to one gate line among the first to (n−1)-th gate lines and receives a data voltage through the data line. The second pixel includes a second pixel electrode and a first light-blocking pattern. The second pixel electrode is electrically connected to the (n)-th gate line and receives the data voltage through the data line. The first light-blocking pattern is formed in a region, in which the second pixel electrode is formed, to block light.

Each of the first and second pixel electrodes may include a main sub-electrode and a secondary sub-electrode separated from each other. The first display panel may further include a first display substrate and a second display substrate. The first display substrate may have the gate lines, the data line, the first pixel electrode and the second pixel electrode that are formed on the first base substrate. The second display substrate may be coupled to the first display substrate to interpose a liquid crystal layer between the first display substrate and the second display substrate.

The first light-blocking pattern may be a gate metal pattern that is formed on the first base substrate formed from a metal layer that is the same as that from which the gate lines are formed or may be a source metal pattern that is formed on the first base substrate formed from a metal layer that is the same as that from which the data line is formed. Preferably, the first light-blocking pattern may be formed on the first base substrate on which the secondary sub-electrode of the second pixel electrode is formed.

The first pixel may further include a first transistor switch, a second transistor switch, a third transistor switch and a charge-up capacitor. The first transistor switch may be connected to the (n−1)-th gate line, the data line and the main sub-electrode of the first pixel electrode. The second transistor switch may be connected to the (n−1)-th gate line, the data line and the secondary sub-electrode of the first pixel electrode. The third transistor switch may be connected to the (n)-th gate line and the secondary sub-electrode of the first pixel electrode. The charge-up capacitor may be formed by an output terminal of the third transistor switch and the main sub-electrode of the first pixel electrode overlapped with the output terminal.

The second pixel may further include a first transistor switch, a second transistor switch and a third transistor switch. The first transistor switch may be connected to the (n)-th gate line, the data line and the main sub-electrode of the second pixel electrode. The second transistor switch may be connected to the (n)-th gate line, the data line and the secondary sub-electrode of the second pixel electrode. The third transistor switch may be electrically floated.

The second display substrate may further include a second light-blocking pattern, a color filter layer and a common electrode. The first light-blocking pattern may be formed in a region of a second base substrate, the region in which the gate lines and the data line are formed. The color filter layer may be formed on the second base substrate corresponding to the pixel electrodes. The common electrode may have a plurality of openings that are formed on the color filter layer and may divide a main sub-region and a secondary sub-region into a plurality of domains. The main sub-electrode may be formed in the main sub-region, and the secondary sub-electrode may be formed in the secondary sub-region.

The first light-blocking pattern may be formed on the second base substrate and may have a plurality of holes. For example, each of the holes may have a round shape and may be uniformly formed in the plurality of domains. A pair of the holes may form a chevron shape and may be formed in the domains with a uniform size. The holes may form a check pattern that includes first line holes extended in the first direction and second line holes extended in the second direction. The first light-blocking pattern may include the same material as the second light-blocking pattern.

In another aspect of the present invention, a method of manufacturing a display substrate is provided as follows. n gate lines extended in a first direction, data lines extended in a second direction crossing the first direction, and a first light-blocking pattern are formed on a base substrate. The first light-blocking pattern is formed in each of pixel regions adjacent to (n)-th gate line. A pixel electrode is formed in each of the pixel regions on which the first light-blocking pattern is formed, and the pixel electrode includes a main sub-electrode and a secondary sub-electrode separated from each other.

In still another aspect of the present invention, a method of manufacturing a display substrate is provided as follows. A first light-blocking pattern having a plurality of holes is formed in pixel regions adjacent to a last horizontal line of a base substrate. The base substrate has n×m pixel regions, wherein n and m are natural numbers. A color filter layer is formed on the base substrate, on which the first light-blocking pattern is formed. A common electrode is formed on the color filter layer, and has a plurality of openings to divide each of the pixel regions into a plurality of domains.

According to the display panel and the method of manufacturing the display substrate of the present invention, a first light-blocking pattern is formed on a pixel that is connected to a last gate line, so that a luminance difference between the pixel that is connected to the last gate line and a pixel that is connected to one of the remainder of the gate lines may be decreased.

DESCRIPTION OF THE EMBODIMENTS

Some embodiments of the invention will now be described with reference to the accompanying drawings. These embodiments are not limiting. The drawings are not necessarily to scale.

It will be understood that if an element or layer is referred to as being "on," "connected to" or "coupled to" another element or layer, then there may or may not be intervening elements or layers. In contrast, when an element is referred to as being "directly on," "directly connected to" or "directly coupled to" another element or layer, there are no intervening elements or layers. Like numbers refer to like elements throughout. As used herein, the term "and/or" includes any and all combinations of one or more of the associated items.

It will be understood that the terms first, second, third etc. may be used herein for ease of reference to various elements, components, regions, layers and/or sections. These terms are not limiting and are only used to distinguish one element, component, region, layer or section from another.

Spatially relative terms, such as "beneath," "below," "lower," "above," "upper" and the like, may be used herein to describe interrelation between elements or features. The invention however is not limited to a particular orientation referenced by such terms, and includes other orientations of the device in use or operation.

The drawings do not necessarily show all features of the invention, and some features are shown schematically for ease and clarity of illustration. The invention covers variations which can be obtained, for example, due to different manufacturing techniques and/or tolerances. For example, an implanted region illustrated as a uniformly doped rectangle may have rounded boundaries, and may have non-uniform doping. Likewise, implantation performed to provide a buried region may in fact provide some doping outside of the buried region.

Figure 1:
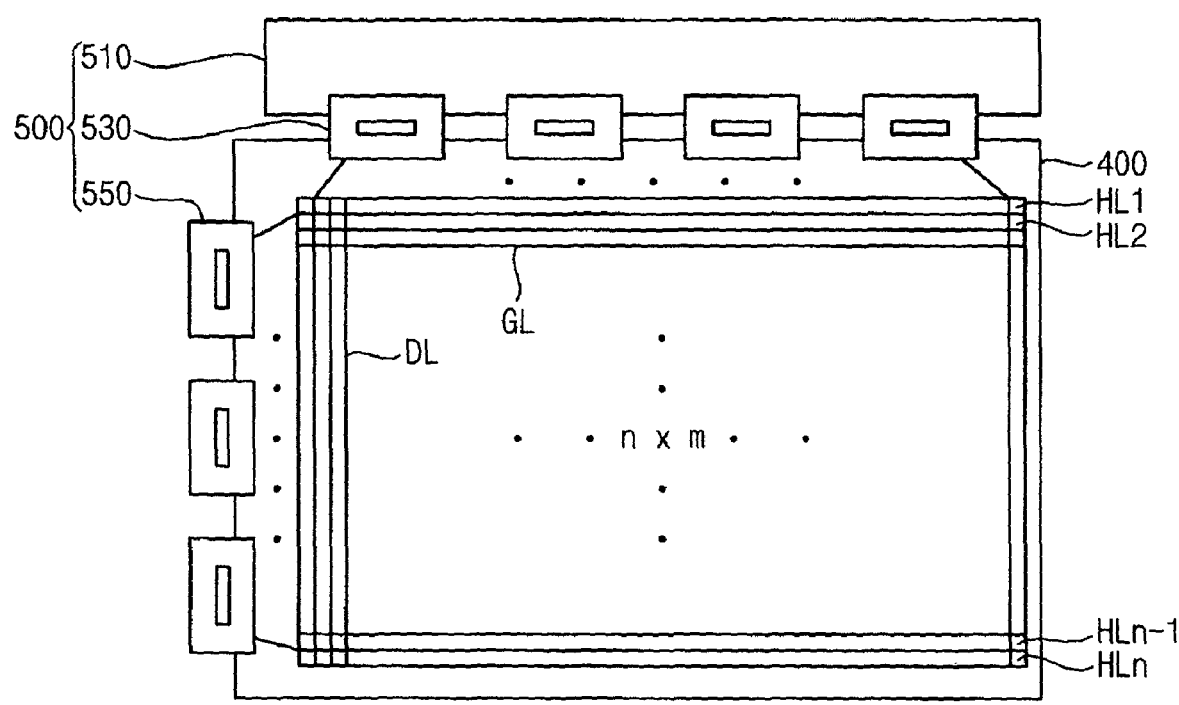
FIG. 1 is a plan view of a display device according to an embodiment of the present invention.
Figure 2A:
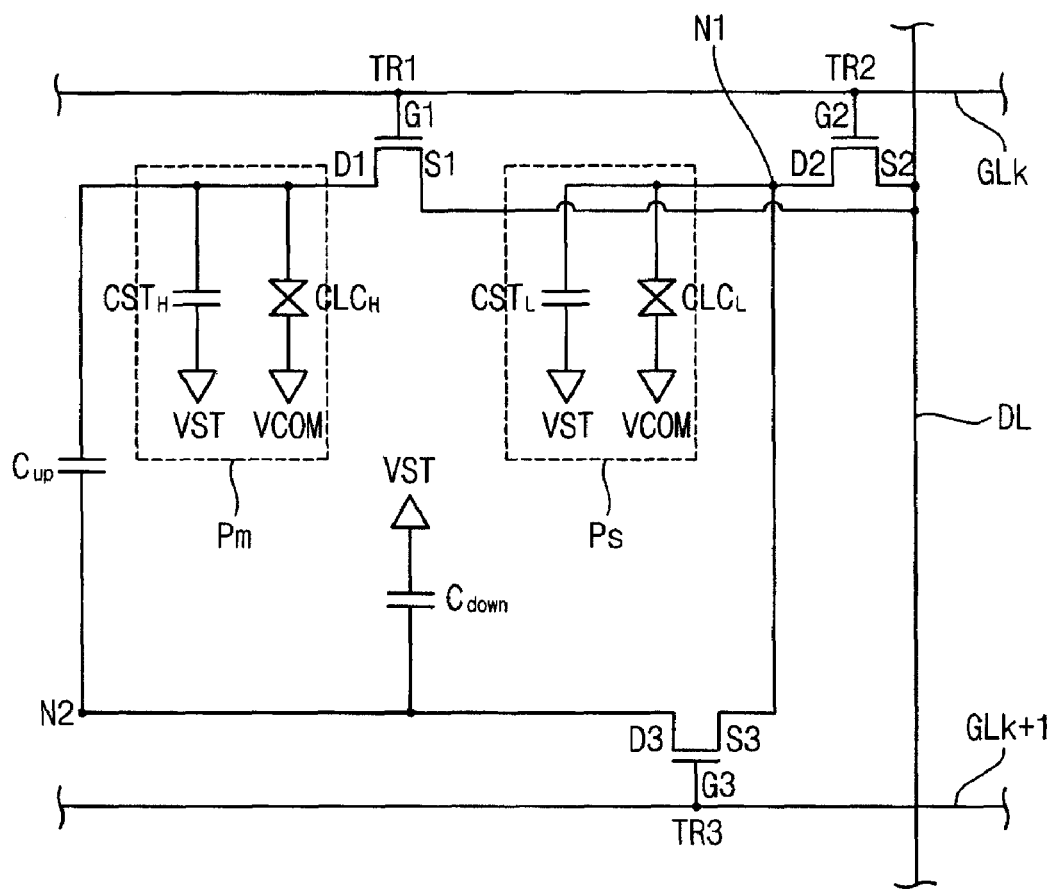
FIG. 2A is a circuit diagram illustrating a representative pixel in all but the last horizontal pixel row of the display panel in FIG. 1.
Figure 2B:
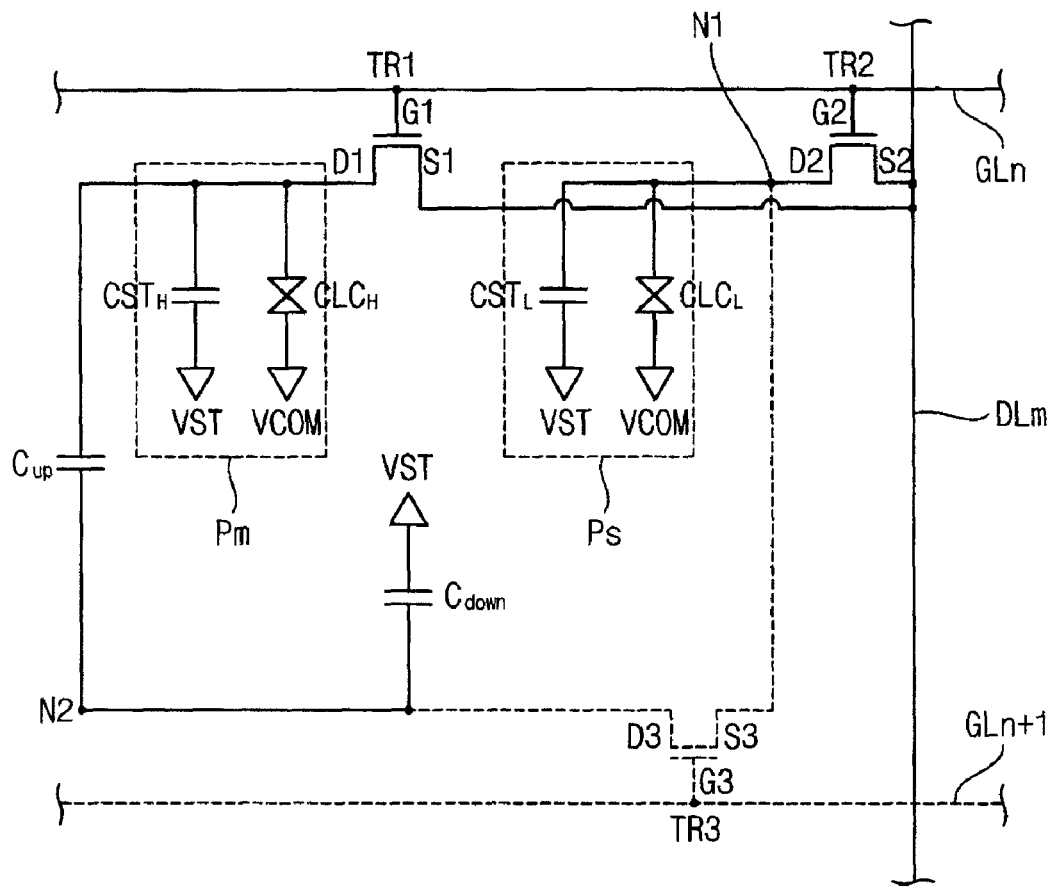
FIG. 2B is a circuit diagram illustrating a representative pixel in the last (bottom) pixel row of the display panel in FIG. 1.

FIG. 1 is a plan view illustrating a display device according to an embodiment of the present invention. The display device includes two types of pixels, termed respectively "first pixel" and "second pixel" below. The bottom row consists of the second pixels. In some embodiments, the device includes n rows of pixels, with the last row (row "n") consisting of the second pixels and the remaining (n−1) rows consisting of the first pixels. FIG. 2A is a circuit diagram of a first pixel. FIG. 2B is a circuit diagram of a second pixel.

The display device of FIGS. 1, 2A and 2B includes a display panel 400 and a driving circuit 500. The display panel 400 includes gate lines GL, data lines DL traversing the gate lines GL, and pixels driven by gate signals and data signals supplied via the gate lines GL and the data lines DL.

The driving circuit 500 includes a source driving circuit 530 and a gate driving circuit 550 that are electrically connected to a printed circuit board (PCB) 510. The source driving circuit 530 and the gate driving circuit 550 receive driving signals from an external device via the PCB 510. The source driving circuit 530 includes a source driving chip formed on a flexible PCB and electrically connected to the PCB 510 and to the display panel 400. The source driving circuit 530 generates data signals based on the source driving signals from the PCB 510 and outputs the data signals to the data lines DL. The gate driving circuit 550 includes a gate driving chip formed on the flexible PCB. The gate driving circuit 550 generates gate signals based on the gate driving signals from the PCB 510 and outputs the gate signals to the gate lines GL.

In some embodiments, the display panel 400 includes n gate lines GL, m data lines DL and n×m pixels. The source driving circuit 530 outputs the data signals to the m data lines DL and the gate driving circuit 550 outputs the gate signals to the n gate lines GL. Numbers n and m are natural numbers.

The display panel 400 includes n horizontal pixel rows HL1, . . . , HLn electrically connected to the respective n gate lines GL. Each of the horizontal pixel rows contains m pixels that receive the data signals from the respective m data lines DL. The first (n−1) pixel rows HL1, . . . , HLn−1 consist of first pixels such as pixel Pu1 shown in FIG. 2A. The last pixel row HLn consists of second pixels such as pixel Pu2 shown in FIG. 2B.

The first pixel Pu1 includes a main sub-pixel Pm, a secondary sub-pixel Ps, a third transistor switch TR3, a discharge capacitor Cdown and a charge-up capacitor Cup. The main sub-pixel Pm includes a first transistor switch TR1, a first liquid crystal capacitor $CLC_H$ and a first storage capacitor $CST_H$. The secondary sub-pixel Ps includes a second transistor switch TR2, a second liquid crystal capacitor $CLC_L$ and a second storage capacitor $CST_L$. The pixel electrode of each first pixel Pu1 ("first pixel electrode" hereinbelow) consists of (i) the main sub-electrode which is part of the main sub-pixel Pm, and (ii) the secondary sub-electrode which is part of the secondary sub-pixel Ps. The first liquid crystal capacitor $CLC_H$ is formed by the main sub-electrode, the liquid crystal layer, and a common electrode. The second liquid crystal capacitor $CLC_L$ is formed by the secondary sub-electrode, the liquid crystal layer and the common electrode.

The first pixel Pu1 of FIG. 2A is at the intersection of a gate line Glk (k<n) and a data line DL. In this pixel, a first gate electrode G1 which is a gate electrode of the first transistor switch TR1 is connected to the (k)-th gate line GLk. A first source electrode S1 which is a source electrode of the first transistor switch TR1 is connected to the data line DL. A first drain electrode D1 which is a drain electrode of the first transistor switch TR1 is connected to a first terminal of the first liquid crystal capacitor $CLC_H$ (for example, to the main sub-electrode of the first pixel electrode). A first terminal of the first storage capacitor $CST_H$ is connected to the first terminal of the first liquid crystal capacitor $CLC_H$. A second terminal of the first liquid crystal capacitor $CLC_H$ (for example, the common electrode) receives a first common voltage VCOM, and a second terminal of the first storage capacitor $CST_H$ receives a second common voltage VST. Here, k is less than n, and is a natural number.

A second gate electrode G2 which is a gate electrode of the second transistor switch TR2 is connected to the (k)-th gate line GLk. A second source electrode S2 which is a source electrode of the second transistor switch TR2 is connected to the data line DL. A second drain electrode D2 which is a drain electrode of the second transistor switch TR2 is connected to a first terminal of the second liquid crystal capacitor $CLC_L$ (for example, the secondary sub-electrode of the first pixel electrode). A first terminal of the second storage capacitor $CST_L$ is connected to the first terminal of the second liquid crystal capacitor $CLC_L$. A second terminal of the second liquid crystal capacitor $CLC_L$ (for example, the common electrode) receives the first common voltage VCOM, and the second terminal of the second storage capacitor $CST_L$ receives the second common voltage VST.

A third gate electrode G3 which is a gate electrode of the third transistor switch TR3 is connected to the (k+1)-th gate line GLk+1. A third source electrode S3 which is a source electrode of the third transistor switch TR3 is connected to the second drain electrode D2 of the second transistor switch TR2. A third drain electrode D3 which is a drain electrode of the third transistor switch TR3 is connected to a first terminal of the charge-up capacitor Cup. A second terminal of the charge-up capacitor Cup is connected to the first drain electrode D1 of the first transistor switch TR1. A first terminal of the discharge capacitor Cdown is connected to the third drain electrode D3 of the third transistor switch TR3 and a second terminal of the discharge capacitor Cdown is connected to the second common voltage VST.

The first pixel Pu1 operates as follow. When the gate signal applied to the (k)-th gate line GLk turns on the first and second transistor switches TR1 and TR2, a data voltage (for example, 5 V) on the data line DL is applied to the first liquid crystal capacitor $CLC_H$ and the first storage capacitor $CST_H$.

Accordingly, the first liquid crystal capacitor $CLC_H$ and the first storage capacitor $CST_H$ are charged to the data voltage, e.g. about 5 V. In this example, the first and second common voltages VCOM and VST may be about 0 V.

The charge-up capacitor Cup is connected to a first node N1 at the second drain electrode D2 of the second transistor switch TR2 via the first and second transistor switches TR1, TR2. The charge-up capacitor Cup is therefore charged to a voltage equal to the voltage difference between the first node N1 and a second node N2 at the drain D3 of the third transistor switch G3. The voltage across the discharge capacitor Cdown is equal to the voltage difference between the second node N2 and the second common voltage VST.

When the gate signal on the (k+1)-th gate line GLk+1 turns on the third transistor switch TR3, the voltage (5 V) on the first node N1 at the third drain electrode D3 is applied to the first terminal (at node N2) of the charge-up capacitor Cup through the third transistor switch TR3. The previous voltage at the node N2 was obtained from the previous voltage on the data line DL, and thus had the opposite polarity (with respect to the common voltage VCOM) from the current voltage.

When the first terminal of the charge-up capacitor Cup receives the voltage (5 V) of the first node N1, the voltage at the second terminal of the charge-up capacitor Cup increases (in magnitude). Accordingly, the voltage across the first liquid crystal capacitor $CLC_H$ and the voltage across the first storage capacitor $CST_H$ also increase because these capacitors are connected to the second terminal of the charge-up capacitor Cup. Therefore, the voltages across the first liquid crystal capacitor $CLC_H$ and the first storage capacitor $CST_H$ become higher than the voltages across the second liquid crystal capacitor $CLC_L$ and the second storage capacitor $CST_L$. Thus, the voltage of the main sub-pixel Pm becomes higher than the voltage of the secondary sub-pixel Ps. The voltage on the second terminal of the discharge capacitor Cdown is discharged due to the connection to the second common voltage VST (0 V).

The second pixel Pu2 includes a main sub-pixel Pm, a secondary sub-pixel Ps, a third transistor switch TR3, a discharge capacitor Cdown and a charge-up capacitor Cup. The main sub-pixel Pm includes a first transistor switch TR1, a first liquid crystal capacitor $CLC_H$ and a first storage capacitor $CST_H$. The secondary sub-pixel Ps includes a second transistor switch TR2, a second liquid crystal capacitor $CLC_L$ and a second storage capacitor $CST_L$. The pixel electrode of each second pixel Pu2 ("second pixel electrode" hereinbelow) consists of (i) the main sub-electrode which is part of the main sub-pixel Pm, and (ii) the secondary sub-electrode which is part of the secondary sub-pixel Ps. The first liquid crystal capacitor $CLC_H$ is formed by the main sub-electrode of the second pixel electrode, the liquid crystal layer, and the common electrode. The second liquid crystal capacitor $CLC_L$ is formed by the secondary sub-electrode of the second pixel electrode, the liquid crystal layer and the common electrode.

In the second pixel Pu2, a first gate electrode G1 which is a gate electrode of the first transistor switch TR1 is connected to the (n)-th gate line GLn. A first source electrode S1 which is a source electrode of the first transistor switch TR1 is connected to the data line DL (data line DLm in the example of FIG. 2B). A first drain electrode D1 which is a drain electrode of the first transistor switch TR1 is connected to a first terminal of the first liquid crystal capacitor $CLC_H$ (for example, to the main sub-electrode of the second pixel electrode). A first terminal of the first storage capacitor $CST_H$ is connected to the first terminal of the first liquid crystal capacitor $CLC_H$. A second terminal of the first liquid crystal capacitor $CLC_H$ (for example, the common electrode) receives the first common voltage VCOM, and a second terminal of the first storage capacitor $CST_H$ receives the second common voltage VST.

A second gate electrode G2 which is a gate electrode of the second transistor switch TR2 is connected to the (n)-th gate line GLn. A second source electrode S2 which is a source electrode of the second transistor switch TR2 is connected to the data line DL, and a second drain electrode D2 which is a drain electrode of the second transistor switch TR2 is connected to a first terminal of the second liquid crystal capacitor $CLC_L$ (for example, to the secondary sub-electrode of the second pixel electrode). A first terminal of the second storage capacitor $CST_L$ is connected to the first terminal of the second liquid crystal capacitor $CLC_L$. A second terminal of the second liquid crystal capacitor $CLC_L$ (for example, the common electrode) receives the first common voltage VCOM, and the second terminal of the second storage capacitor $CST_L$ receives the second common voltage VST.

A third gate electrode G3 which is a gate electrode of the third transistor switch TR3 electrically floats. A third source electrode S3 which is a source electrode of the third transistor switch TR3 is connected to the second drain electrode D2 of the second transistor switch TR2, and a third drain electrode D3 which is a drain electrode of the third transistor switch TR3 is connected to a first terminal of the charge-up capacitor Cup. A second terminal of the charge-up capacitor Cup is connected to the first drain electrode D1 of the first transistor switch TR1. A first terminal of the discharge capacitor Cdown is connected to the third drain electrode D3 of the third transistor switch TR3, and a second terminal of the discharge capacitor Cdown is connected to the second common voltage VST.

In another embodiment, the third gate electrode G3 may be electrically connected to the (n+1)-th gate line. In the present embodiment, the second pixel Pu2 is in the last horizontal pixel row HLn, so that the third gate electrode G3 electrically floats. Therefore, the third transistor switch TR3 is always off, and the charge-up capacitor Cup is prevented from boosting the voltage of the first liquid crystal capacitor $CLC_H$.

In the first pixel Pu1, when the third transistor switch TR3 is turned on, the voltage of the second liquid capacitor $CLC_L$ decreases. Therefore, the voltage of the second liquid crystal capacitor $CLC_L$ of the second pixel Pu2 is higher than the voltage of the second liquid crystal capacitor $CLC_L$ of the first pixel Pu1. Thus, if equal voltages are provided on the data lines to a first pixel Pu1 and a second pixel Pu2, the second pixel Pu2 may be brighter than the first pixel Pu1.

In order to decrease the luminance difference between the first and second pixels Pu1 and Pu2, a first light-blocking pattern is formed on the light transmitting region of each second pixel Pu2 in the last horizontal pixel row HLn. In this way, the luminance difference between the last horizontal pixel row HLn and the remaining horizontal pixel rows HL1, . . . , HLn−1 may be decreased.

Figure 3:
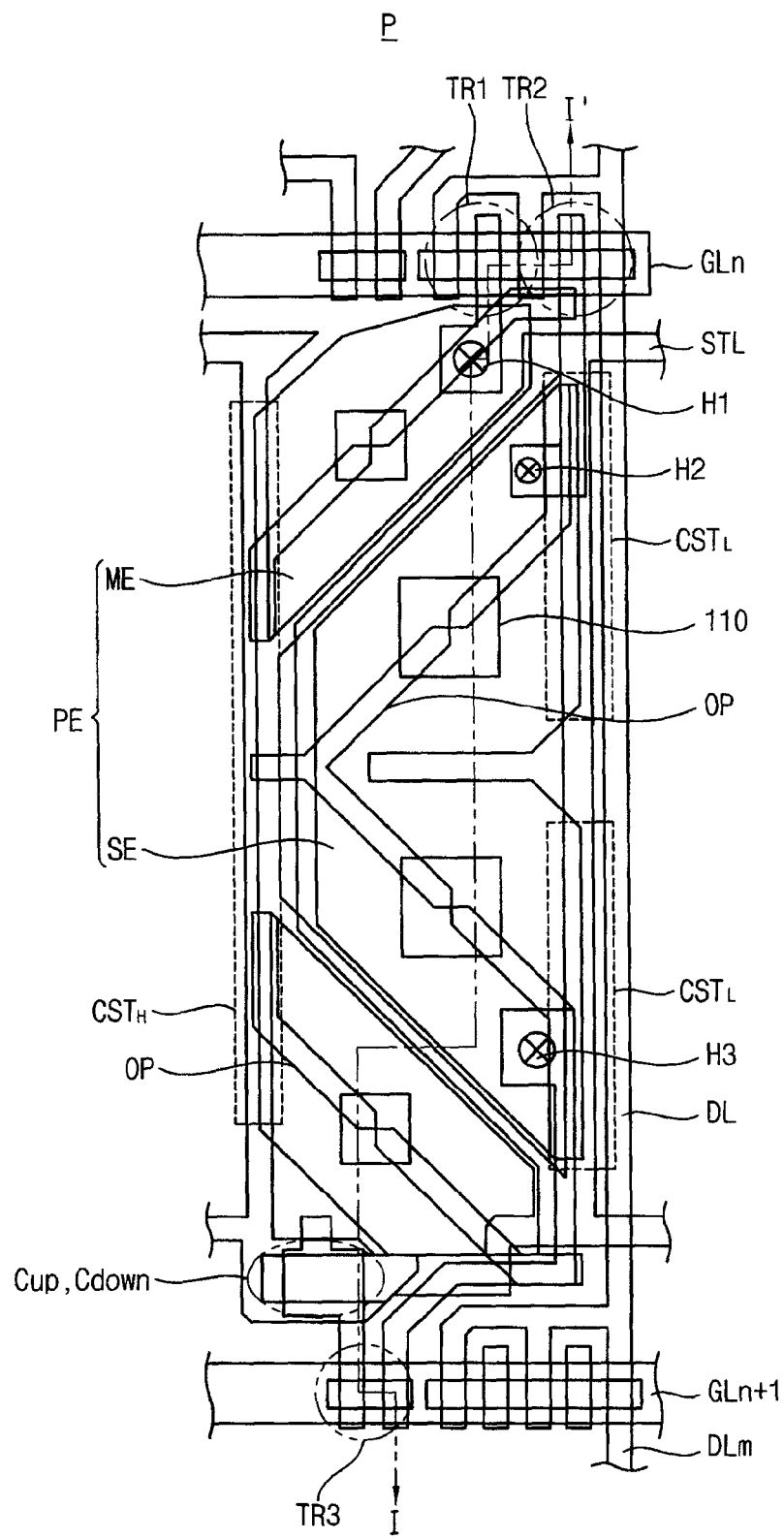
FIG. 3 is a plan view illustrating the pixel in the last row as in FIG. 2B according to an embodiment of the present invention.
Figure 4:
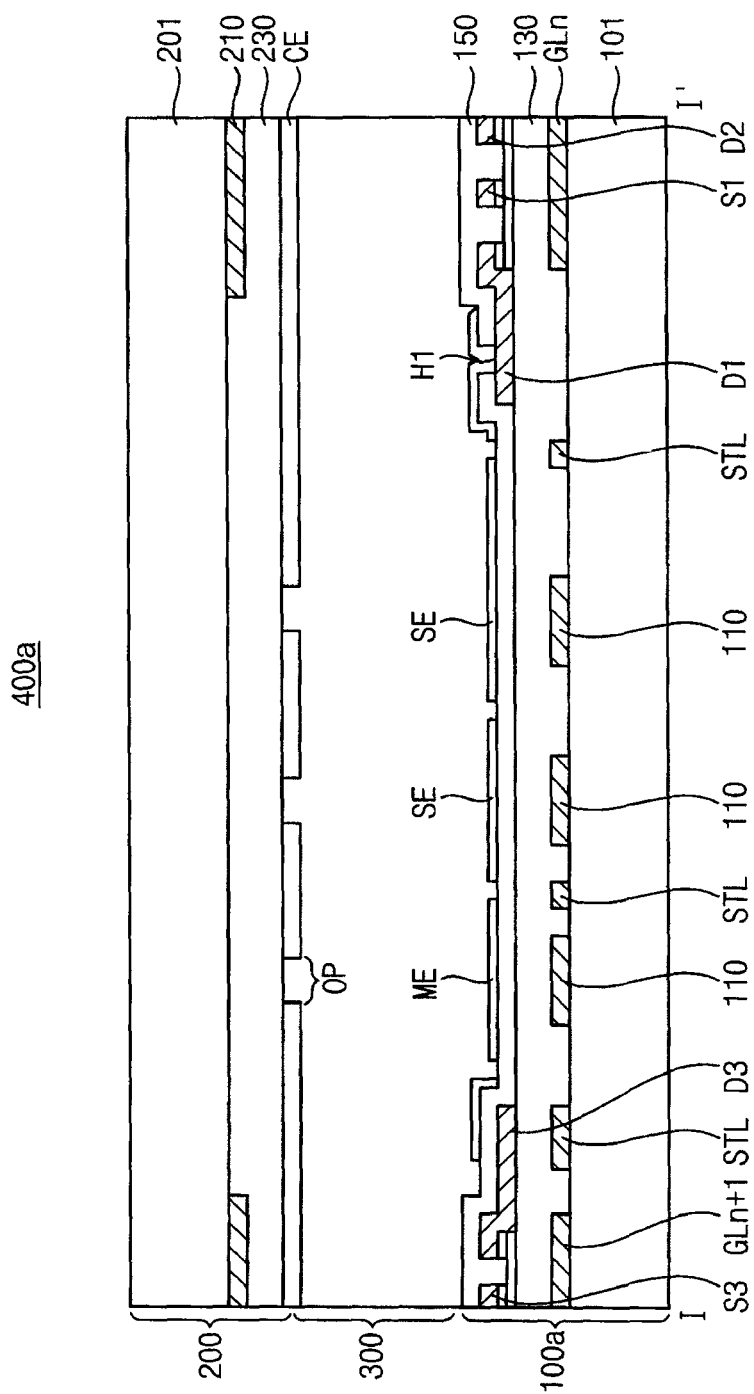
FIG. 4 is a cross-sectional view taken along a line I-I' in FIG. 3.

FIG. 3 is a plan view illustrating the second pixel of FIG. 2B according to an embodiment of the present invention. FIG. 4 shows a vertical cross section along the line I-I' in FIG. 3.

Referring to FIGS. 3 and 4, the second pixel Pu2 in the last horizontal pixel row of the display panel 400a includes portions of a first display substrate 100a, a second display substrate 200 and a liquid crystal layer 300. Each pixel occupies a pixel region P.

The first display substrate 100a includes a first base substrate 101, gate lines GL1 to GLn+1, the data lines DL1 to DLm, the pixel electrodes PE, the first transistor switches TR1, the second transistor switches TR2, the third transistor switches TR3, storage lines STL and first light-blocking patterns 110. The gate lines GL1 to GLn+1, the data lines DL1 to DLm, the pixel electrodes PE, the first transistor switches TR1, the second transistor switches TR2, the third transistor switches TR3, the storage lines STL and the first light-blocking patterns 110 are formed on the first base substrate 101.

The gate lines GL1 to GLn+1 are formed from a gate metal layer to extend in a first direction. The data lines DL1 to DLm are made from a source metal layer to extend in a second direction transverse to the first direction. The gate line GLn+1 may electrically float or be omitted. In particular, the gate line GLn+1 can be insulated from the gate driving circuit so as not to receive the gate signal.

Each pixel electrode PE includes the main sub-electrode ME and the secondary sub-electrode SE that are separated from each other. The main sub-electrode ME and the secondary sub-electrode SE include transparent conductive material and are transparent.

In each pixel Pu2, the input terminals (the gate and source electrodes) of the first transistor switch TR1 are connected to the (n)-th gate line GLn and the data line DL ((m)-th data line DLm in the example of FIG. 3), respectively. The output terminal (the drain electrode) of the first transistor switch TR1 is connected to the main sub-electrode ME. More particularly, the first transistor switch TR1 includes the first gate electrode (not shown) connected to the (n)-th gate line GLn, the first source electrode S1 connected to the data line DL, and the first drain electrode D1 connected to the main sub-electrode ME through a first contact opening H1.

The input terminals (the gate and source electrodes) of the second transistor switch TR2 are connected to the (n)-th gate line GLn and the data line DL, respectively. The output terminal (the drain electrode) of the second transistor switch TR2 is connected to the secondary sub-electrode SE. More particularly, the second transistor switch TR2 includes the second gate electrode (not shown) connected to the (n)-th gate line GLn, the second source electrode (not shown) connected to the data line DL, and the second drain electrode D2 connected to the secondary sub-electrode SE. The first transistor switch TR1 and the second transistor switch TR2 may share their input terminals.

The input terminals (the gate and source electrodes) of the third transistor switch TR3 are connected to the (n+1)-th gate line GLn+1 and the secondary sub-electrode SE, respectively. The output terminal (the drain electrode) of the third transistor switch TR3 is connected to the output terminal of the first transistor switch TR1. More particularly, the third transistor switch TR3 includes the third gate electrode (not shown) connected to the (n+1)-th gate line GLn+1, the third source electrode S3 electrically connected to the main sub-electrode ME through a third contact opening H3, and the third drain electrode D3 overlapping with the main sub-electrode ME. The charge-up capacitor Cup is defined by the third drain electrode D3 overlapping with the main sub-electrode ME.

The storage line STL is made from the gate metal layer to overlap with edge portions of the main sub-electrode ME and the secondary sub-electrode SE. More particularly, the storage line STL includes a first region overlapping with an edge portion of the main sub-electrode ME, a second region overlapping with an edge portion of the secondary sub-electrode SE, and a third region overlapping with the output terminal of the third transistor switch TR3.

The first storage capacitor $CST_H$ is defined by the first region of the storage line STL and the main sub-electrode ME. The second storage capacitor $CST_L$ is defined by the second region of the storage line STL and the secondary sub-electrode SE. The discharge capacitor Cdown is defined by the third region of the storage line STL and a portion of the third drain electrode D3 which is the output terminal of the third transistor switch TR3.

In the present embodiment, the second pixel Pu2 includes the third transistor switch TR3, the charge-up capacitor Cup and the discharge capacitor Cdown. Alternatively, the third transistor switch TR3, the charge-up capacitor Cup and the discharge capacitor Cdown may be omitted from the second pixel Pu2.

The first light-blocking pattern 110 is made from the gate metal layer over a part or parts of the main sub-electrode ME and/or of the sub-electrode SE of each second pixel Pu2. As explained above in connection with FIGS. 2A and 2B, the first light-blocking pattern 110 may reduce the luminance difference between the first pixels Pu1 and the second pixels Pu2. The second pixels Pu2 could be brighter than the first pixels Pu1 as explained above, and the first light-blocking pattern 110 darkens the second pixels Pu2 to provide the same luminance as the first pixels Pu1 for equal voltages on the respective data lines.

In some embodiments, in each pixel Pu2, the first light-blocking pattern 110 is formed only over the secondary sub-electrode SE because the region of the secondary sub-electrode SE of the first pixel Pu1 is relatively darker than the region of the main sub-electrode ME of the first pixel Pu1 when the third transistor switch TR3 of the first pixel Pu1 is turned on. In this case, the luminance difference may be decreased by darkening the region of the secondary sub-electrode SE of the second pixel Pu2. Alternatively, as illustrated, the first light-blocking pattern 110 may be formed both over the main sub-electrodes ME and the secondary sub-electrodes SE to reduce the luminance difference.

A gate insulating layer 130 and a protective insulating layer 150 are formed over the first base substrate 101. The gate insulating layer 130 is formed over the patterned gate metal layer which provides the gate electrodes, the storage lines STL, and gate lines GL1 to GLn+1 on the first substrate 101. The protective insulating layer 150 is formed over the patterned source metal layer which provides the source electrodes S1 and S3, the drain electrodes D1, D2 and D3, and the data lines DL. In each pixel Pu2, the protective insulating layer 150 has the first contact opening H1, a second contact opening H2 and the third contact opening H3. The second display substrate 200 is coupled to the first display substrate 100a. The liquid crystal layer 300 is provided between the first display substrate 100a and the second display substrate 200. The second display substrate 200 includes a second light-blocking pattern 210, a color filter layer 230 and the common electrode CE that are formed on the second base substrate 201. The second light-blocking pattern 210 is formed in regions overlying the gate lines and the data lines. The color filter layer 230 is formed in regions overlying the pixel electrodes PE of the first display substrate 100a. The color filter layer 230 may include red, green and blue filters.

The common electrode CE is formed on the color filter layer 230. The common electrode CE has a plurality of openings OP which divide each pixel region P into a plurality of domains. The openings OP have chevron shapes as illustrated.

The first liquid crystal capacitor $CLC_H$ is formed in the region of main sub-pixel Pm by the common electrode CE, the main sub-electrode ME and the liquid crystal layer 300. The second liquid crystal capacitor $CLC_L$ is formed by the common electrode CE, the secondary sub-electrode SE and the liquid crystal layer 300.

The second display substrate 200 may have organic protrusions formed to divide the pixel region P into a plurality of domains.

Figure 5A:
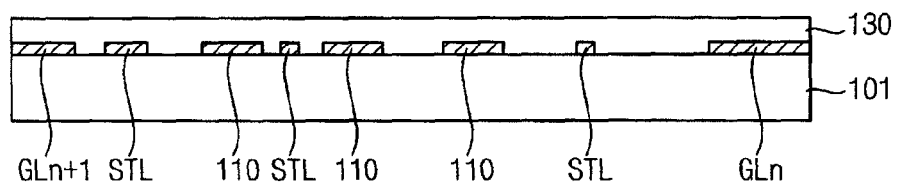
FIGS. 5A to 5C are cross-sectional views of a first display substrate as in FIG. 4 at different stages of fabrication.
Figure 5B:
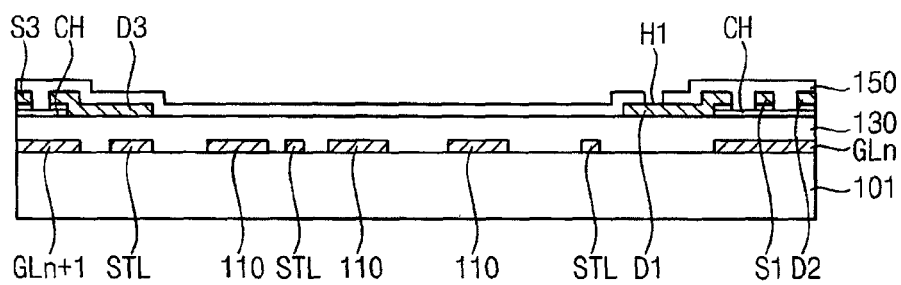
Figure 5C:
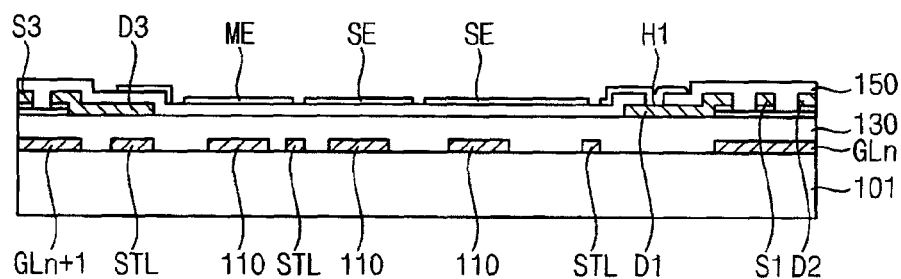

FIGS. 5A to 5C are cross-sectional views illustrating a method of manufacturing the first display substrate of FIG. 4.

Referring to FIGS. 3 and 5A, a gate metal layer is formed on the first base substrate 101 and patterned to provide the gate lines GL1 to GLn+1, the storage lines STL and the first light-blocking patterns 110.

The gate insulating layer 130 is formed over the patterned gate metal layer and in physical contact therewith.

Referring to FIGS. 3 and 5B, channel regions CH are formed on the gate insulating layer 130. The channel regions CH are formed over the gate electrodes of the first transistor switches TR1, the second transistor switches TR2 and the third transistor switches TR3.

A source metal layer is formed over the channel regions CH and patterned to provide the data lines DL and the source and drain electrodes of the first transistor switches TR1, the second transistor switches TR2 and the third transistor switches TR3.

The protective insulating layer 150 is formed over the patterned source metal layer. A first contact opening H1, a second contact opening H2 and a third contact opening H3 are etched in the protective insulating layer 150 in each pixel.

Referring to FIGS. 3 and 5C, a transparent conductive layer is formed over the protective insulating layer 150 and in the first contact openings H1, the second contact openings H2 and the third contact openings H3 and is patterned to form the pixel electrodes PE. Each pixel electrode PE includes the main sub-electrode ME and the secondary sub-electrode SE that are separated from each other. In each pixel, the main sub-electrode ME is electrically connected to the first transistor switch TR1 through the first contact opening H1. The secondary sub-electrode SE is electrically connected to the second transistor switch TR2 and the third transistor switch TR3 through the second contact opening H2 and the third contact opening H3.

Now some other embodiments will be described. The same reference numbers will be used for the same or similar elements, and repetitive description of such elements will be avoided.

Figure 6:
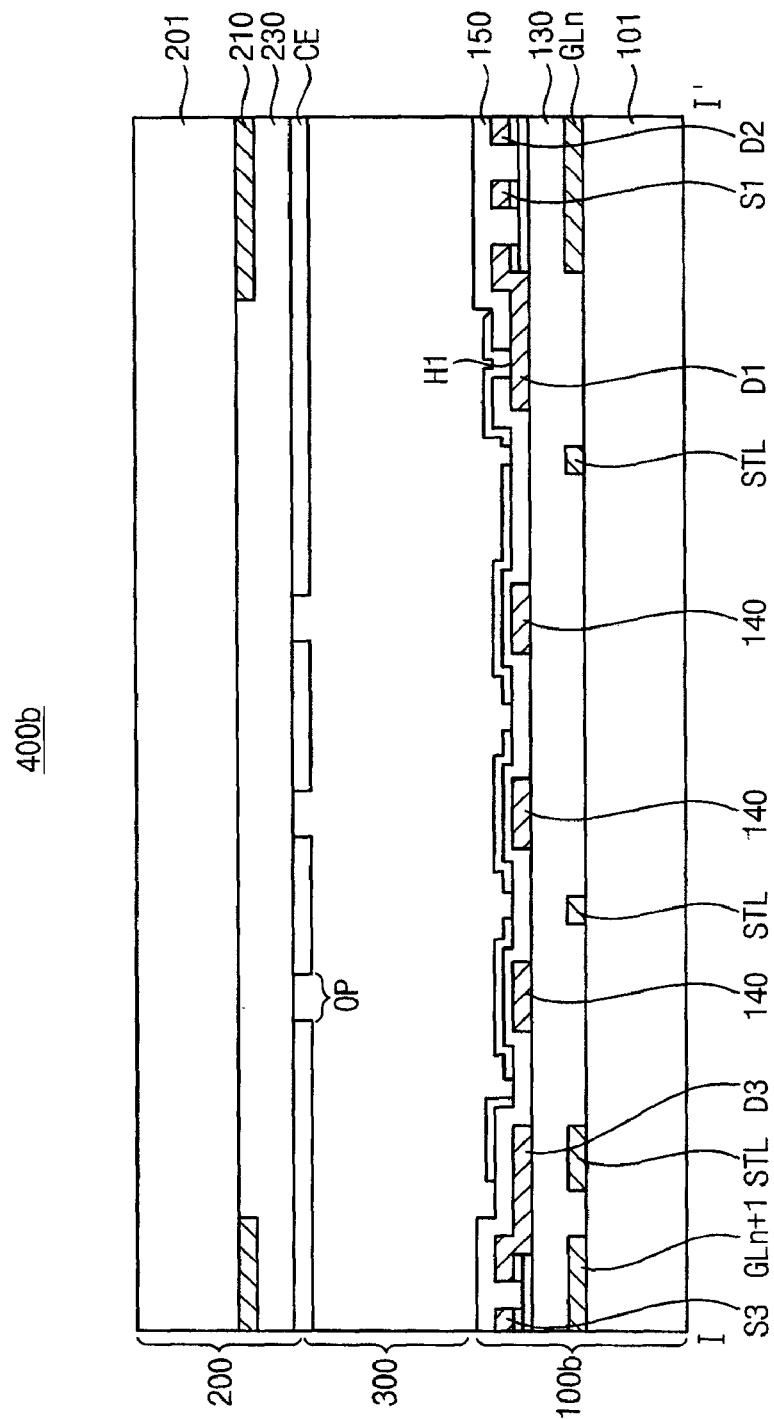
FIG. 6 is a cross-sectional view illustrating a pixel in the last row according to another embodiment of the present invention.

FIG. 6 is a cross-sectional view illustrating a second pixel Pu2 according to another embodiment of the present invention. The second pixel Pu2 in the last horizontal pixel row of a display panel 400b includes portions of a first display substrate 100b, a second display substrate 200 and a liquid crystal layer 300.

The first display substrate 100b includes a first light-blocking pattern 140. The first light-blocking pattern 140 is formed from the source metal layer. The first light-blocking pattern 140 occupies part of a region containing the main sub-electrode ME and the secondary sub-electrode SE.

As described above in connection with FIGS. 2A and 2B, the first light-blocking pattern 140 is formed in each second pixel Pu2 in order to reduce the luminance difference between the first pixels Pu1 and the second pixels Pu2. The first light-blocking pattern 140 overlaps with the secondary sub-electrodes SE and/or the main sub-electrodes ME to substantially equalize the amount of light transmitted through a first pixel Pu1 and a second pixel Pu2 at equal voltages on the respective data lines.

The first display substrate 100b in FIG. 6 can be manufactured similarly to the first display substrate 100a in FIGS. 5A to 5C. Alternatively, the first light-blocking pattern 140 can be formed from the source metal layer rather than the gate metal layer as in FIGS. 5A-5C. Accordingly, detailed description of the manufacturing process will be omitted.

Figure 7:
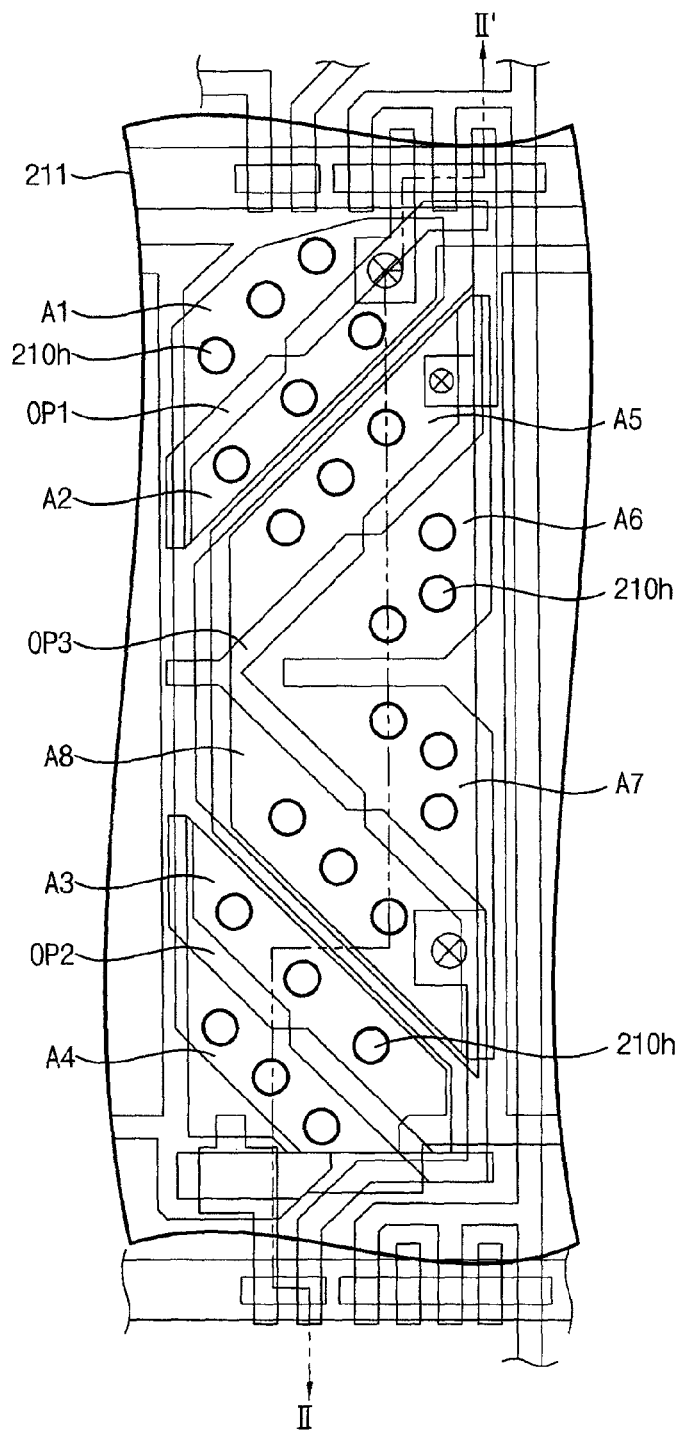
FIG. 7 is a plan view illustrating a pixel in the last row according to another embodiment of the present invention.
Figure 8:
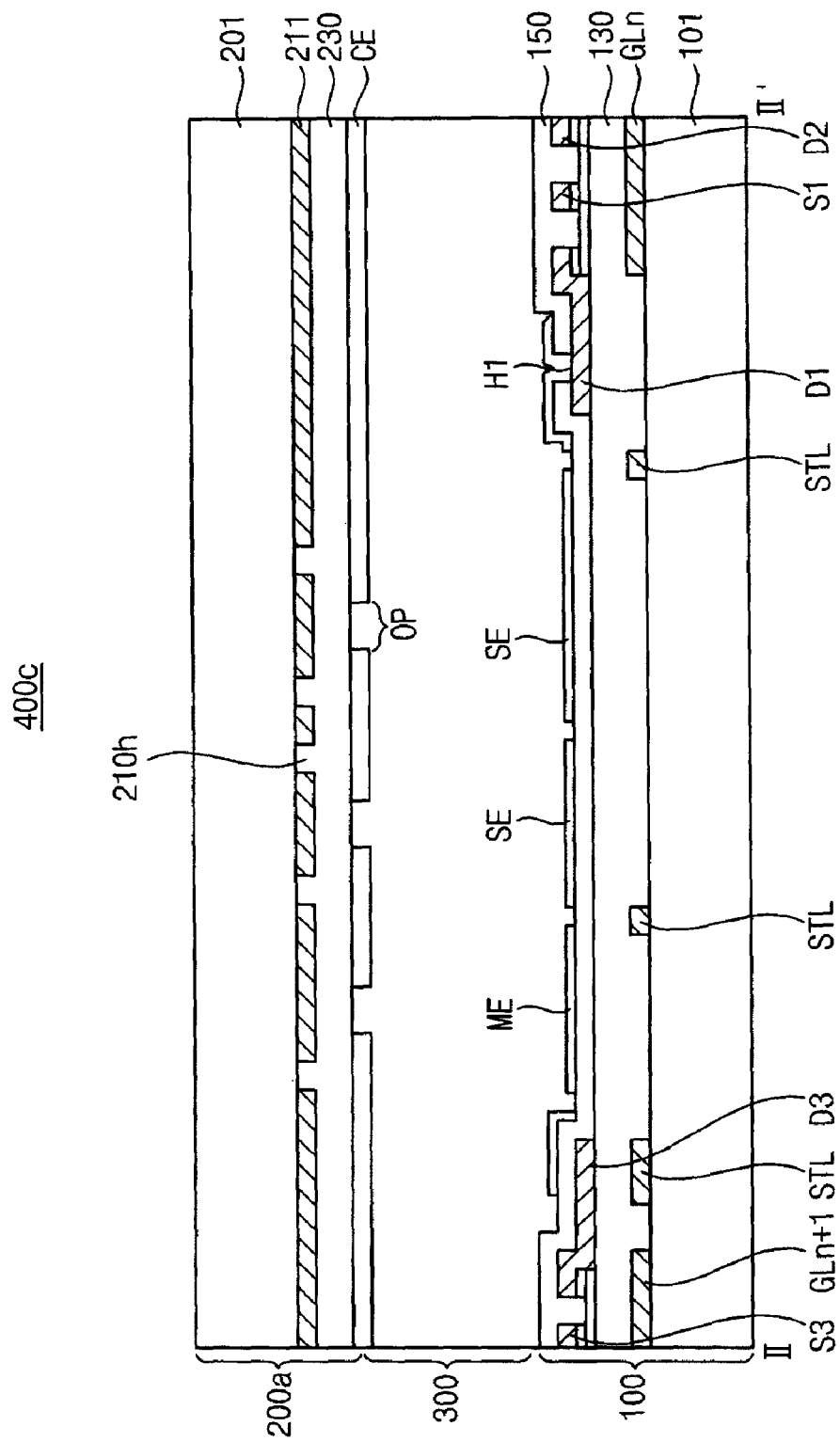
FIG. 8 is a cross-sectional view taken along a line II-II' in FIG. 7.

FIG. 7 is a plan view of a second pixel Pu2 according to another embodiment of the present invention. FIG. 8 shows a vertical cross section along a line II-II' in FIG. 7. The second pixel Pu2 in the last horizontal pixel row of a display panel 400c includes portions of a first display substrate 100, a second display substrate 200a and a liquid crystal layer 300.

The first display substrate 100 includes a first base substrate 101, gate lines GL1 to GLn+1, data lines DL1 to DLm, pixel electrodes PE, first transistor switches TR1, second transistor switches TR2, third transistor switches TR3 and storage lines STL. The first base substrate 101 defines pixel regions P. The gate lines GL1 to GLn+1, the data lines DL1 to DLm, the pixel electrodes PE, the first transistor switches TR1, the second transistor switches TR2, the third transistor switches TR3 and the storage lines are formed on the first base substrate 101.

Each pixel electrode PE includes a main sub-electrode ME and a secondary sub-electrode SE separated from the main sub-electrode ME. The pixel region of the main sub-electrode ME will be called a main sub-region herein, and the pixel region of the secondary sub-electrode SE will be called a secondary sub-region.

The second display substrate 200a includes a first light-blocking pattern 211, a color filter layer 230 and a common electrode CE that are formed on a second base substrate 201.

The first light-blocking pattern 211 is formed over the gate lines GLn and GLn+1 and the data lines DL1 to DLm. The first light-blocking pattern 211 is also present in the main and secondary sub-regions of each second pixel Pu2. The first light-blocking pattern 211 includes a plurality of holes 210h that have a circular shape and partially expose the main sub-electrode ME and the secondary sub-electrode SE of each second pixel Pu2.

The color filter layer 230 is formed in the pixel regions, and the common electrode CE is formed on the color filter layer 230. The common electrode CE has openings OP1, OP2 and OP3 for dividing each pixel region P into a plurality of domains.

In this example, in each pixel, the first opening OP1 and the second opening OP2 are formed in the main sub-region and divide the main sub-region into a first domain A1, a second domain A2, a third domain A3 and a fourth domain A4. The third opening OP3 is formed in the secondary sub-region and divides the secondary sub-region into a fifth domain A5, a sixth domain A6, a seventh domain A7 and an eighth domain A8.

The circular holes 210h of the first light-blocking pattern 211 may be uniformly distributed over the domains A1 to A8 of each second pixel Pu2. As illustrated, three holes 210h are formed in each of the domains. Accordingly, the domains may provide the same luminance within the second pixel Pu2. This structure reduces the luminance difference between the first pixels Pu1 and the second pixels Pu2.

Figure 9A:
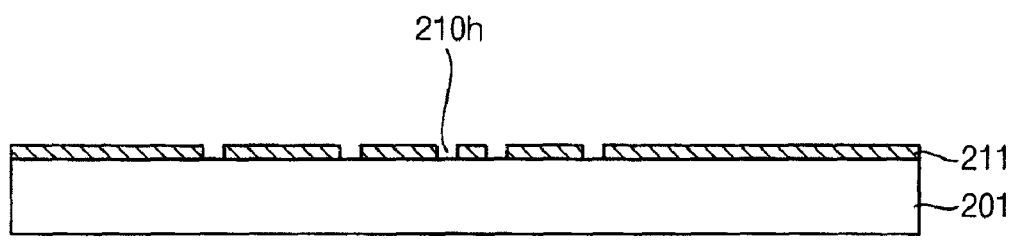
FIGS. 9A to 9B are cross-sectional views illustrating a second display substrate as in FIG. 8 at different stages of fabrication.
Figure 9B:
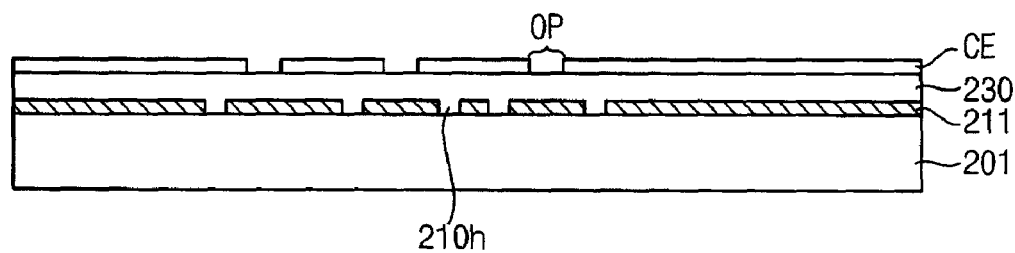

FIGS. 9A to 9B are cross-sectional views illustrating a method of manufacturing the second display substrate 200a of FIG. 8. Referring to FIGS. 7 and 9A, a light-blocking layer is formed on the second base substrate 201 and patterned to provide the first light-blocking pattern 211 as described above. This light-blocking pattern includes portions overlying the gate lines and the data lines to function as a conventional black matrix (BM). The first light-blocking pattern 211 includes a plurality of the holes 210h as described above.

Referring to FIGS. 7 and 9B, the color filter layer 230 is formed on the second base substrate 201 over the first light-blocking pattern 211. The color filter layer 230 includes red, green and blue filters.

A transparent conductive layer is formed on the second base substrate 201 over the color filter layer 230 and patterned to provide the common electrode CE with the openings OP1, OP2 and OP3.

Figure 10:
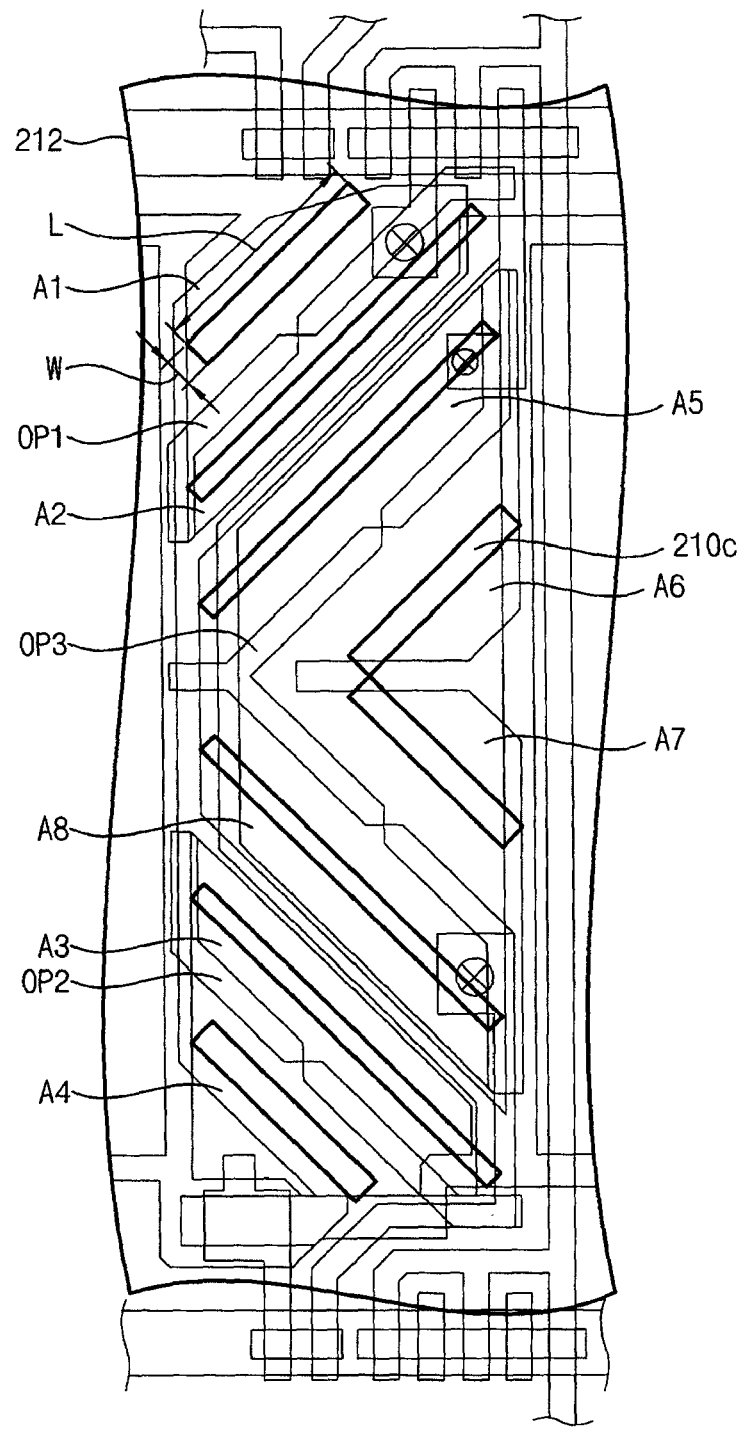
FIG. 10 is a plan view illustrating a pixel in the last row according to another embodiment of the present invention.

FIG. 10 is a plan view illustrating a second pixel according to another embodiment of the present invention. In this embodiment, the second pixel Pu2 in the last horizontal pixel row of a display panel 400d includes portions of a first display substrate 100, a second display substrate 200a and a liquid crystal layer 300. The second display substrate 200a includes a first light-blocking pattern 212, a color filter layer 230 and a common electrode CE that are formed on a second base substrate 201.

The first light-blocking pattern 212 is formed in the region corresponding to the gate lines GLn and GLn+1 and the data lines DL1 to DLm. The first light-blocking pattern 212 is formed in the main and secondary sub-regions. In each pixel Pu2, the first light-blocking pattern 212 includes a plurality of holes 210c that have chevron shapes and partially expose the main sub-electrode ME and the secondary sub-electrode SE.

The common electrode CE includes openings OP1, OP2 and OP3 for dividing each pixel region P into a plurality of domains. In this example, in each pixel, the first opening OP1 and the second opening OP2 are formed in the main sub-region and divide the main sub-region into a first domain A1, a second domain A2, a third domain A3 and a fourth domain A4. The third opening OP3 is formed in the secondary sub-region and divides the secondary sub-region into a fifth domain A5, a sixth domain A6, a seventh domain A7 and an eighth domain A8.

The chevron-shaped holes 210c of the first light-blocking pattern 212 may be uniformly distributed in the domains A1 to A8 of each second pixel Pu2. As illustrated, at least some of the holes 210c may be shaped as oblique lines, and such holes may be formed in each domain. The widths W and lengths L of holes 210c can be controlled to uniformly distribute the holes 210c over the domains A1 to A8. For example, the holes 210c formed in the first domain A1 may be shorter and wider than the holes 210c formed in the second domain A2 to provide uniform distribution of the holes over the domains A1 to A8. For example, the ratio of the domain width to the hole width may be the same for all the domains, and the ratio of the domain length to the hole length may also be the same.

The structure of FIG. 10 serves to reduce the luminance difference between the second pixels Pu2 and the first pixels Pu1.

Figure 11:
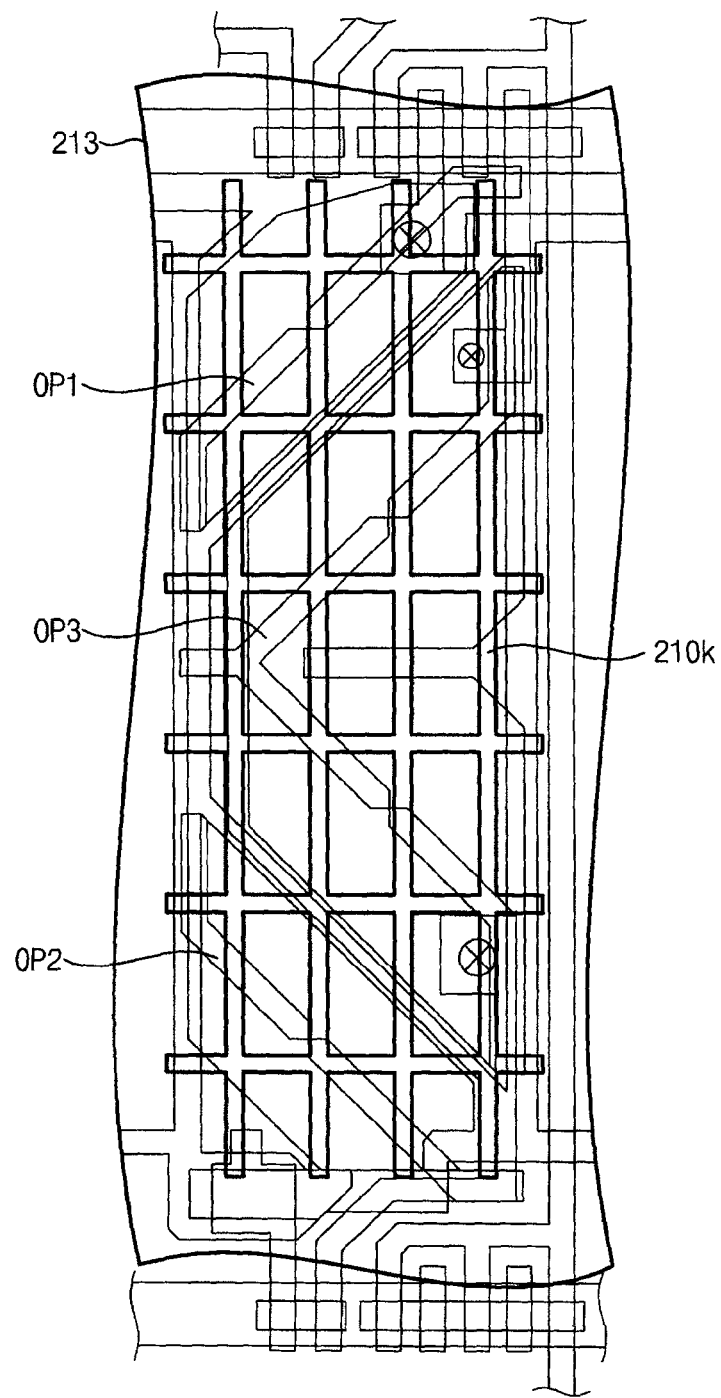
FIG. 11 is a plan view illustrating a pixel in the last row according to another embodiment of the present invention.

FIG. 11 is a plan view illustrating a second pixel according to another embodiment of the present invention. Referring to FIG. 11, each second pixel Pu2 in the last horizontal pixel row of a display panel 400e includes portions of a first display substrate 100, a second display substrate 200a and a liquid crystal layer 300. The second display substrate 200a includes a first light-blocking pattern 213, a color filter layer 230 and a common electrode CE that are formed on a second base substrate 201.

The first light-blocking pattern 213 is formed in the region corresponding to the gate lines GLn and GLn+1 and the data lines DL. The first light-blocking pattern 213 is formed in the main and secondary sub-regions. The first light-blocking pattern 213 includes a plurality of holes 210k that have a check pattern and partially expose the main sub-electrode ME and the secondary sub-electrode SE of each second pixel Pu2 in a uniform manner with respect to the area. Thus, the ratio of the exposed area to the unexposed area is the same in each sub-electrode. For example, the holes 210k may include holes of a first linear shape and holes of a second linear shape. The holes of the first linear shape are parallel to the gate lines GLn and GLn+1 and are formed at substantially equal intervals. The holes of a second linear shape are parallel to the data lines DL and are formed at substantially equal intervals.

The structure of FIG. 11 serves to decrease the luminance difference between the second pixels Pu2 and the first pixels Pu1.

Thus, some embodiments of the present invention provide a light-blocking pattern in the pixels of the last horizontal pixel row to reduce the luminance difference with the remaining pixels.

Having described embodiments in accordance with the present disclosure of invention and their advantages, it is noted that various changes, substitutions and alterations can be made thereto that are within the scope and spirit of the present teachings.

What is claimed is:

1. A liquid crystal display (LCD) panel comprising:
   a plurality N horizontal pixel rows disposed one below the next with each row including respective pixel regions arranged horizontally one after the next and with each row extending in a first direction, where N is a natural number greater than one and the Nth pixel row constitutes a last pixel row of the LCD panel;
   a plurality of data lines extending in a second direction transverse to the first direction;
   where the respective pixel regions of the first through (N−1)th pixel rows are each constituted by a first pixel structure having a respective first pixel electrode connected so as to be charged to a respective first data voltage in response to a data signal received from a respective one of the data lines; and
   where the respective pixel regions of the last (the Nth) pixel row are each constituted by a second pixel structure that is different from the first pixel structure and that has a respective second pixel electrically connected to so as to be charged to a respective second data voltage in response to the data signal received from a respective one of the data lines,
   where the difference between the first and second pixel structures includes the second pixel structure having a first light-blocking pattern disposed in an interior of the pixel region of the second pixel structure so as to partially obscure light that otherwise would have passed through the interior of the pixel region of the second pixel structure.

2. The display panel of claim 1, wherein each of the first and second pixel electrodes includes a main sub-electrode and a secondary sub-electrode separated from each other.

3. The display panel of claim 2, further comprising:
   a first display substrate including a first base substrate and also including on the first base substrate a plurality of gate lines, the data lines, the first pixel electrodes and the second pixel electrodes;
   a second display substrate coupled to the first display substrate; and
   a liquid crystal layer disposed between the first display substrate and the second display substrate.

4. The display panel of claim 3, wherein the first light-blocking patterns of the second pixel structures are formed on the first base substrate from a metal layer from which the gate lines are also formed.

5. The display panel of claim 3, wherein the first light-blocking patterns of the second pixel structures are metal patterns formed on the first base substrate from a metal layer from which the data lines are also formed.

6. The display panel of claim 3, wherein the first and second pixel electrodes are identical in structure.

7. The display panel of claim 3, wherein said plurality of gate lines includes first (1st) through Nth gate lines corresponding to first (1st) through Nth of the N horizontal pixel rows and wherein the first pixel structure of a Kth one of the 1st through (N−1)th pixel rows further comprises:
   a respective first transistor switch connected to the corresponding Kth gate line, to the respective data line and to the main sub-electrode of the first pixel electrode;
   a respective second transistor switch connected to the corresponding Kth gate line, to the respective data line and to the secondary sub-electrode of the first pixel electrode;
   a respective third transistor switch connected to the corresponding (K+1)th gate line and to the secondary sub-electrode of the first pixel electrode; and
   a respective charge-up capacitor formed at an overlap of an output terminal of the third transistor switch with the main sub-electrode of the first pixel electrode.

8. The display panel of claim 7, wherein the second pixel structure further comprises:
   a respective first transistor switch connected to the Nth gate line, to the respective data line and to the main sub-electrode of the second pixel electrode;
   a respective second transistor switch connected to the Nth gate line, to the respective data line and to the secondary sub-electrode of the second pixel electrode; and
   a respective third transistor switch which is configured to permanently electrically float.

9. The display panel of claim 3, wherein the second display substrate further comprises:
   a second base substrate;
   a second light-blocking pattern formed in a region of the second base substrate, the region overlapping the gate lines and the data lines of the first display substrate;
   a color filter layer formed on the second base substrate and having color filters disposed thereon in correspondence with the pixel electrodes of the first display substrate; and
   a common electrode having a plurality of openings that subdivide the common electrode into respective main sub-regions and secondary sub-regions thereby defining a plurality of domains, the main sub-electrodes being formed in alignment with the main sub-regions, and the secondary sub-electrode being formed in alignment with the secondary sub-regions.

10. The display panel of claim 9, wherein the second light-blocking pattern is formed on the second base substrate and has a plurality of holes.

11. The display panel of claim 10, wherein each of the holes has a round shape and the holes are uniformly distributed over the domains.

12. The display panel of claim 10, wherein at least one of the holes has a chevron shape, and the holes are uniformly distributed over the domains.

13. The display panel of claim 10, wherein the holes form a check pattern that includes first linear holes extended in the first direction and second linear holes extended in the second direction.

14. A method of manufacturing a liquid crystal display (LCD) substrate, the method comprising:
   on a base substrate, forming n gate lines one below the next and extending in a first direction so that the (n)-th gate line is last, data lines extending in a second direction transverse to the first direction, and a first light-blocking pattern, the first light-blocking pattern being formed only in each of pixel regions adjacent to the (n)-th gate line; and forming a pixel electrode in each of the pixel regions on which the first light-blocking pattern is formed, the pixel electrode including a main sub-electrode and a secondary sub-electrode separated from each other.

15. The method of claim 14, wherein the first light-blocking pattern is formed from a metal layer from which the gate lines are formed.

16. The method of claim 14, wherein the first light-blocking pattern is formed from a metal layer from which the data lines are formed.

17. A method of manufacturing a liquid crystal display (LCD) substrate having first to last horizontal line of pixels, comprising:

on a base substrate, forming a first light-blocking pattern having a plurality of holes, the first light-blocking pattern being formed only in pixel regions in the last horizontal line of pixels;

forming a color filter layer on the base substrate and over the first light-blocking pattern; and forming a common electrode over the color filter layer, the common electrode having a plurality of openings to thereby divide each of the pixel regions into a plurality of domains.

18. The method of claim 17, wherein each of the holes is circular and the holes are uniformly distributed over the plurality of domains.

19. The method of claim 17, wherein at least one of the holes has a chevron shape.

20. The method of claim 17, wherein the holes form a check pattern that includes first linear holes and second linear holes crossing each other.

* * * * *